US008255896B2

(12) United States Patent
Wontorcik et al.

(10) Patent No.: US 8,255,896 B2
(45) Date of Patent: *Aug. 28, 2012

(54) NETWORK SOFTWARE NORMALIZATION AND INSTALLATION IN A FIRE DETECTION SYSTEM

(75) Inventors: Glenn Wontorcik, Corcoran, MN (US); Karl Eiden, Monticello, MN (US)

(73) Assignee: Honeywell International Inc., Morristown, NJ (US)

( * ) Notice: Subject to any disclaimer, the term of this patent is extended or adjusted under 35 U.S.C. 154(b) by 1174 days.

This patent is subject to a terminal disclaimer.

(21) Appl. No.: 12/060,408

(22) Filed: Apr. 1, 2008

(65) Prior Publication Data
US 2009/0249325 A1  Oct. 1, 2009

(51) Int. Cl.
G06F 9/44 (2006.01)
G06F 9/45 (2006.01)
(52) U.S. Cl. ............... 717/170; 717/171; 340/506
(58) Field of Classification Search .......... 717/168–174; 340/506, 522–524, 628–629
See application file for complete search history.

(56) References Cited

U.S. PATENT DOCUMENTS

| | | | |
|---|---|---|---|
| 5,483,222 A | 1/1996 | Tice | |
| 6,163,263 A | 12/2000 | Tice et al. | |
| 6,452,490 B1* | 9/2002 | Garland et al. | 340/506 |
| 6,970,183 B1* | 11/2005 | Monroe | 348/143 |
| 7,000,230 B1* | 2/2006 | Murray et al. | 717/172 |
| 7,216,343 B2* | 5/2007 | Das et al. | 717/168 |
| 7,295,128 B2* | 11/2007 | Petite | 340/628 |
| 7,316,013 B2* | 1/2008 | Kawano et al. | 717/168 |
| 7,389,504 B2* | 6/2008 | Kawano et al. | 717/171 |
| 7,461,373 B2* | 12/2008 | Herle et al. | 717/171 |
| 7,516,450 B2* | 4/2009 | Ogura | 717/168 |
| 7,536,686 B2* | 5/2009 | Tan et al. | 717/174 |
| 7,581,217 B2* | 8/2009 | Jhanwar et al. | 717/168 |
| 7,673,298 B2* | 3/2010 | Oyama | 717/168 |
| 7,676,448 B2* | 3/2010 | Henderson et al. | 717/171 |
| 7,696,891 B2* | 4/2010 | Whitney | 340/628 |
| 7,760,081 B2* | 7/2010 | Eiden et al. | 340/506 |

(Continued)

FOREIGN PATENT DOCUMENTS
EP  0 275 448 A1  12/1988
(Continued)

OTHER PUBLICATIONS

Bao et al, "A fire detection system based on intelligent data fusion technology", IEEE, pp. 1096-1101, 2003.*

(Continued)

*Primary Examiner* — Anil Khatri
(74) *Attorney, Agent, or Firm* — Husch Blackwell LLP

(57) ABSTRACT

A fire detection system includes at least one existing fire detection unit, at least one replacement fire detection unit, control circuitry associated with the at least one existing fire detection unit, control circuitry associated with the at least one replacement fire detection unit, a graphical user interface associated with the at least one replacement fire detection unit, and communication media connecting the at least one existing fire detection unit and the at least one replacement fire detection unit. The replacement unit is configured to be compatible with the at least one existing unit, and the graphical user interface controls the configuration of the replacement panel. The control circuitry associated with the replacement unit and the control circuitry associated with the existing unit execute the configuration of the replacement panel.

9 Claims, 5 Drawing Sheets

U.S. PATENT DOCUMENTS

| | | | | |
|---|---|---|---|---|
| 7,818,739 B2 * | 10/2010 | Cox et al. | | 717/171 |
| 7,827,546 B1 * | 11/2010 | Jones et al. | | 717/173 |
| 7,861,239 B2 * | 12/2010 | Mayfield et al. | | 717/170 |
| 7,913,246 B2 * | 3/2011 | Hammond et al. | | 717/173 |
| 8,032,879 B2 * | 10/2011 | Nathan et al. | | 717/169 |
| 8,032,880 B2 * | 10/2011 | Konersmann et al. | | 717/170 |
| 8,035,508 B2 * | 10/2011 | Breed | | 340/539.11 |
| 8,146,072 B2 * | 3/2012 | Trueba | | 717/170 |

FOREIGN PATENT DOCUMENTS

| | | |
|---|---|---|
| WO | WO 2007/035561 A1 | 3/2007 |
| WO | WO 2007/100288 A1 | 9/2007 |

OTHER PUBLICATIONS

Alwast et al, "An adaptive intelligent architecture for fire detection and fire management", IEEE, pp. 1113-1117, 1997.*

Cardenas et al, "Attacks against process control system: risk assessment, detection and response", ACM ASIACCS, pp. 355-366, 2011.*

Fujimura et al, "Implemention of file interpolation detection system", ACM SIGUCCS, pp. 118-121, 2007.*

Nguyen et al, "Clone aware configuration management", IEEE, pp. 123-134, 2009.*

English translation of EP0275448.

* cited by examiner

NETWORK SOFTWARE NORMALIZATION AND INSTALLATION IN A FIRE DETECTION SYSTEM

FIELD OF INVENTION

The present invention relates generally to fire detection systems. More particularly, the present invention relates to fire detection units or panels that can be replaced and configured to be compatible with a network of such units. The configuration process uses only a user interface associated with the unit and does not require additional tools.

BACKGROUND

Fire detection systems are commonly used in business settings to protect life, safety, and property. A fire detection system can include one or more individual fire detection units. Each fire detection or monitoring unit can operate as an individual system. Alternatively, multiple fire detection units can be networked together to form a larger fire detection or monitoring system. Fire detection networks are typically employed in large facilities or multiple buildings, such as campus-type environments.

Examples of fire detection systems are found in U.S. Pat. No. 5,483,222 to Tice entitled "Multiple Sensor Apparatus and Method" and U.S. Pat. No. 6,163,263 to Tice et al. entitled "Circuitry for Electrical Device in Multi-Device Communications System", which are assigned to the assignee hereof. Both U.S. Pat. Nos. 5,483,222 and 6,163,263 are hereby incorporated by reference.

Networked fire detection systems can include two or more independently operating control systems that operate as a larger, single fire detection system. Each such system executes independent application code software. It is important that compatibility is maintained between units. It is also important to maintain compatibility of software or firmware operating on all fire detection units in the network.

One of the known problems associated with fire detection networks has been maintaining compatibility between individual systems or units when the network requires service or additional units are added to the network. If the added units are not compatible with the existing units, then the network may not function correctly.

Traditionally, skilled service personnel would determine the correct version or versions of the various application or applications of the existing units. Then, service personnel would have to update the entire network or modify the added unit to incorporate the same version of the software application or applications present in the units currently operating on the network. Updating each detection unit traditionally requires service personnel traveling to each unit to perform the application update. This process is costly in both man power and time.

The distributed nature of a fire detection network has historically made it difficult to maintain compatible software or firmware as fire detection units or panels are replaced or updated. There is thus a continuing, ongoing need for fire detection networks that employ fire detection units that can be replaced and configured to be compatible with a network of existing units or panels. Preferably, such detection units can be configured using only a graphical user interface on or associated with the unit and without needing additional tools.

DESCRIPTION OF THE PREFERRED EMBODIMENTS

Figure 1:
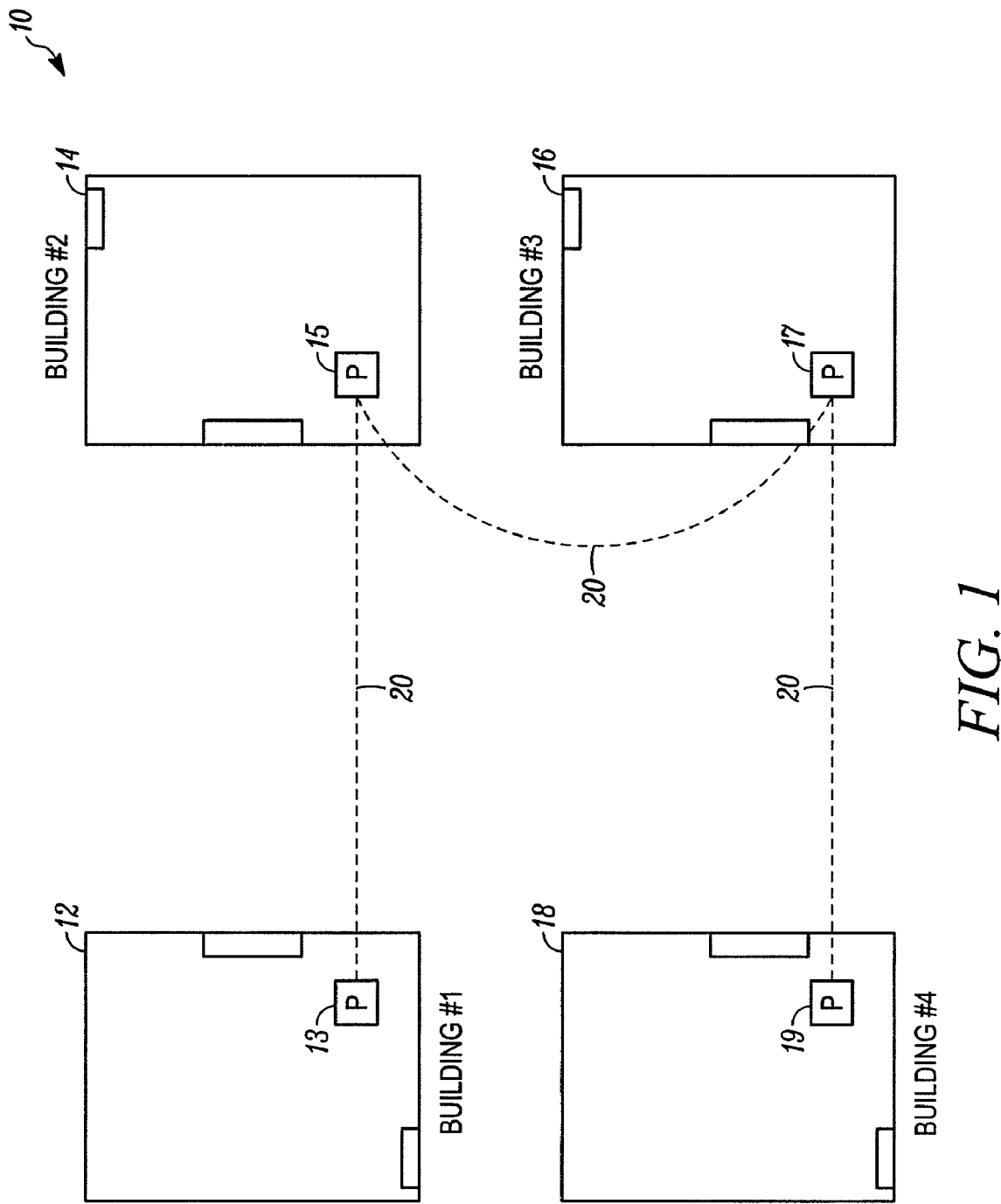
FIG. 1 illustrates a fire detection system in accordance with the present invention.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments of the present invention include a fire detection system or network that employs fire detection units or panels. The fire detection units can be replaced and configured to be compatible with a network of units. In preferred embodiments, such units can be configured using only a graphical user interface on or associated with the unit and without needing additional tools.

When service is required on a fire detection unit or panel, service personnel can replace that unit with a replacement unit. However, the replacement unit may contain a different version of software or firmware application than the other fire detection units in the network. Therefore, the replacement unit may be incompatible with the other units.

In embodiments of the present invention, when a fire detection unit or panel is added to a fire detection network that incorporates more than one fire detection unit, the newly added unit will determine the software or firmware application version or versions of the other units that reside on the network. In one embodiment of the present invention, when a replacement unit is added to a fire detection network, the network automatically interrogates the units that are already present on the network to determine compatibility.

A replacement unit can include control circuitry, a graphical user interface, and a connection port. The control circuitry can further include a programmable processor and associated software. The graphical user interface can include a viewing screen and associated software. Those of skill in the art will understand that the details of the processor, associated software, and control circuitry, and the details of the graphical user interface, viewing screen, and associated software, except as described subsequently, are not limitations of the present invention.

In embodiments of the present invention, the installer or service personnel can view the software or firmware application version or versions of all fire detection units in the network without being physically present at each unit location. The installer or service personnel can use the replacement unit's user interface to view which version or versions of firmware or software application is in use by the other units in the network.

Once the application version of all of the fire detection units on the network is known, the replacement unit can determine if its software or firmware application version is compatible with the existing fire detection units. If it is determined that incompatibility exists, then service personnel are alerted to the incompatibility. The installer can be alerted by a message on the graphical user interface of the replacement unit if any incompatibility exists.

If the software or firmware application version of the replacement unit is not the same as the application version or versions in use by the other units in the network, then the graphical user interface of the replacement unit allows service personnel to select which unit to update. For example, service personnel can choose to update the existing fire detection units in the network. Alternatively, service personnel can choose to update the replacement unit.

Service personnel can be given the option to have the replacement unit obtain a compatible software or firmware application version from an existing network unit. In this embodiment, the installer would have the replacement fire detection unit receive an application from an existing fire detection unit to transfer to the replacement unit the application version of the existing units. Alternatively, service personnel can be given the option to have the replacement unit's software application sent to the existing units on the network. In this embodiment, the installer would be prompted to have the replacement fire detection unit distribute its application to the existing fire detection units on the network.

In embodiments of the present invention, no additional tools or equipment are required to ensure that all fire detection units within the network are normalized with the same version of compatible software or firmware application. Rather, the control circuitry, including the programmable processor and associated software, located within or associated with each unit can execute the configuration or normalization process. Further, the graphical user interfaces on or associated with each unit can control the configuration or normalization process.

Communication between and among the fire detection units within the network can occur using existing network communication media. The media that interconnects all fire detection units in the network may be wired or wireless, or a combination of wired and wireless, as is known in the art. For example, wired media could be copper wire or fiber cable.

FIG. 1 illustrates a fire detection system 10 in accordance with the present invention. In the exemplary embodiment of the present invention illustrated in FIG. 1, the fire detection system 10 is installed in four buildings 12, 14, 16, and 18. Each building 12, 14, 16, 18 contains a fire detection unit 13, 15, 17, 19 respectively located therein.

It is to be understood that the number of buildings and the number of fire detection units included in the fire detection system are not limitations of the present invention. The number of buildings associated with the system could be more or less than the number shown in FIG. 1. Similarly, the number of detection units located within each building could be more than then number shown in FIG. 1. Accordingly, the fire detection system could be associated with as few as one building with more than one detection unit located therein.

The fire detection units 13, 15, 17, 19 can be in wired or wireless communication with one another, or a combination of wired and wireless communication, as would be understood by those of ordinary skill in the art. The communication between and among the units 13, 15, 17, 19 can occur over existing communication media 20. Wired media could be, for example, copper wire or fiber cable.

Figure 4:
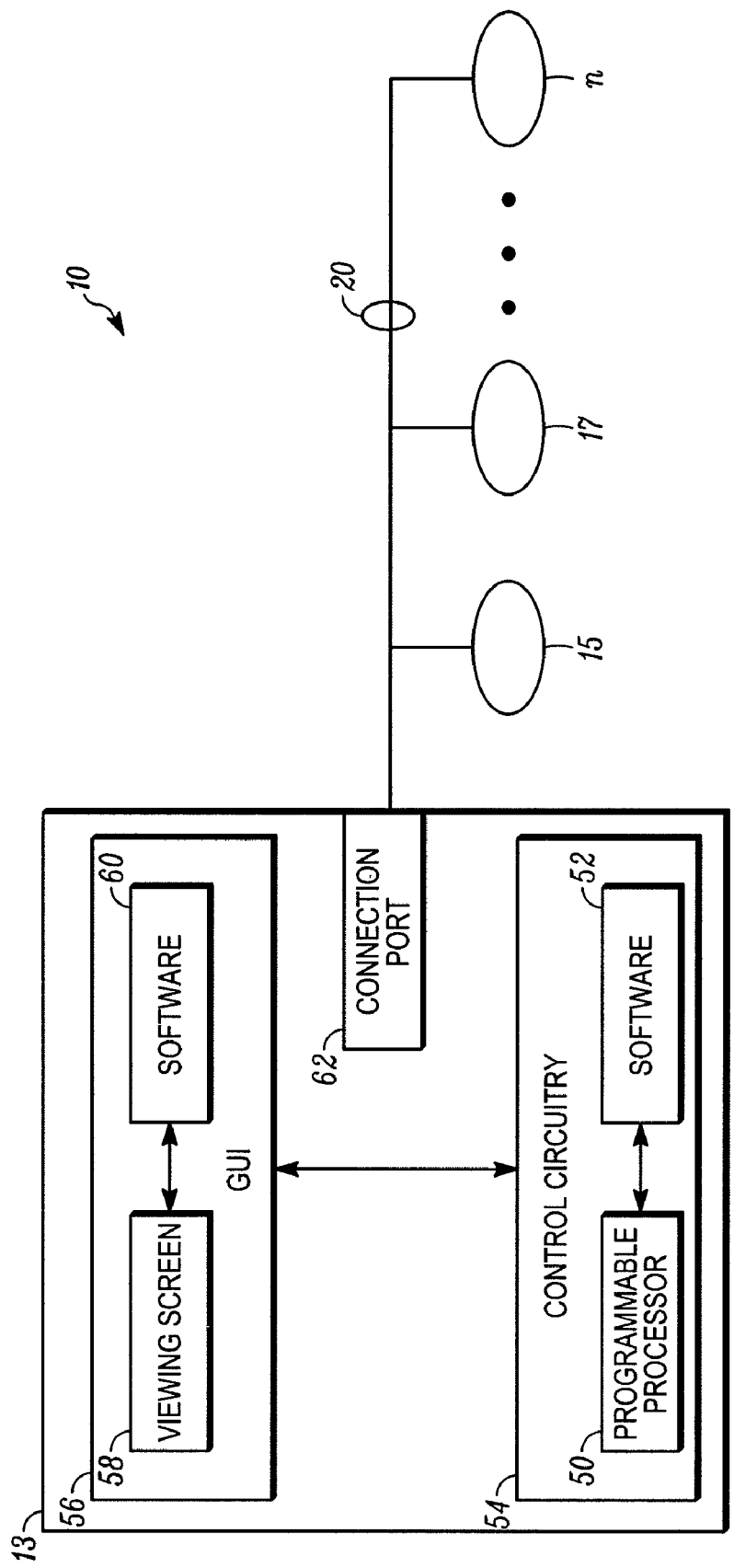
FIG. 4 illustrates a fire detection unit within a network in accordance with the present invention.

FIG. 4 illustrates a fire detection unit in accordance with the present invention. As seen in the exemplary embodiment illustrated in FIG. 4, a fire detection unit 13 can include control circuitry 54 and a graphical user interface 56, which can be in communication with one another. The control circuitry can further include a programmable processor 50 and associated software 52 as would be understood by those of skill in the art. The graphical user interface 56 can include a viewing screen 58 and associated software 60 as would be understood by those of skill in the art. The graphical user interface 56 can be on or associated with the unit 13 as would be understood by those of skill in the art.

The fire detection unit 13 can also include a connection port 62 to wired or wireless communication media 20. The communication media 20 can connect the fire detection unit 13 with other fire detection units 15, 17 . . . n within the fire detection system 10.

Figure 2A:
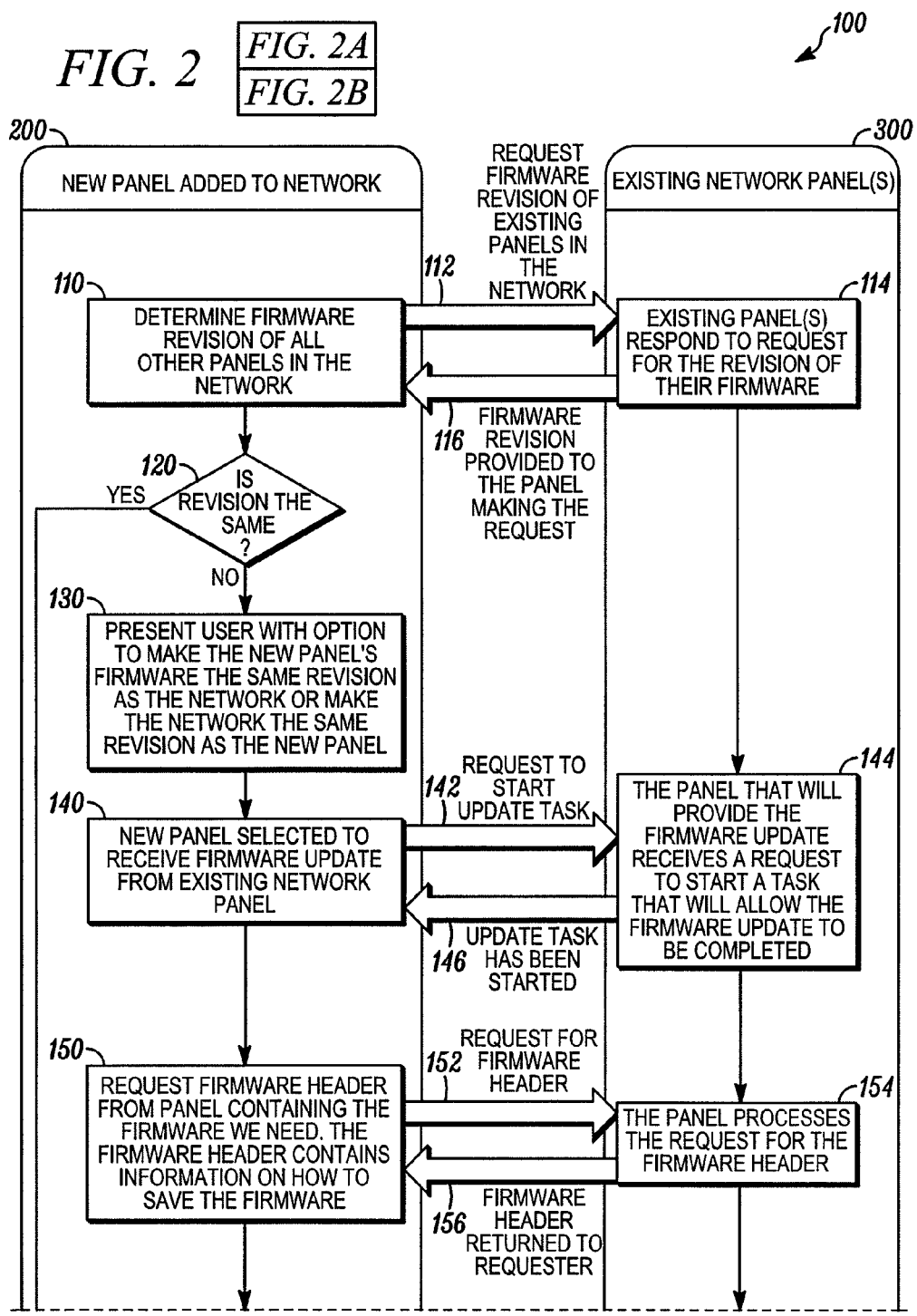
FIG. 2 illustrates a method of operation of a fire detection system in accordance with the present invention.
Figure 2B:
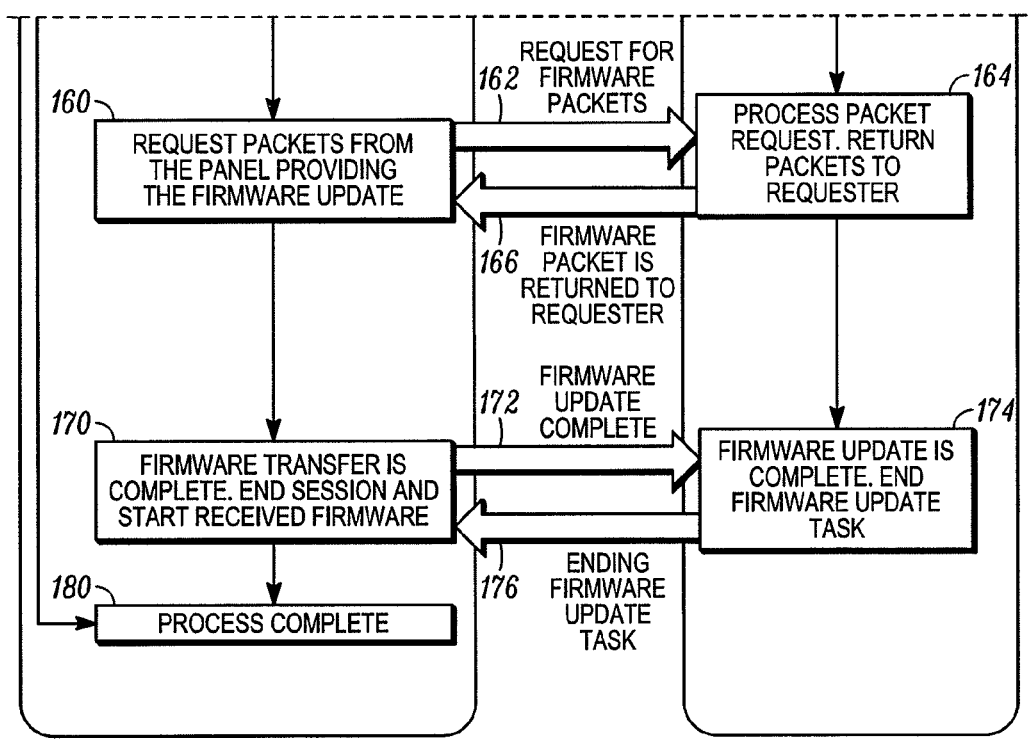

FIG. 2 illustrates a method 100 of operation of a fire detection system in accordance with the present invention. When service is required on a fire detection unit or panel, service personnel can replace that unit with a replacement unit 200.

After the replacement unit 200 is integrated into the network, the replacement unit 200 determines the software or firmware application version or versions of all of the other units in the network, as in 110. Then, the replacement unit 200 requests the software application versions of the existing units in the network, as in 112. An existing unit 300 or units respond to the request for the application version of its software, as in 114.

The replacement unit 200 determines if its version of software application is the same as the existing unit's 300 application version, as in 120. If the versions are the same, then the process proceeds to 180, and the process is complete. If the versions are not the same, then the process proceeds to 130.

The replacement unit 200 presents the user with the option to make the replacement unit's 200 software the same version as the existing units 300 in the network or to make the existing units 300 in the network the same version of software application as the replacement unit 200, as in 130. If the user chooses to update the replacement unit 200 with the application version from an existing unit 300, then FIG. 2 illustrates the remainder of the method 100 of operation in accordance with this embodiment.

The replacement unit 200 selects to receive a software or firmware update from an existing unit 300, as in 140. Then, the replacement unit 200 requests the existing unit 300 to start the update task, as in 142. The existing unit 300 that will provide the software application update receives the request to start a task that will allow the update to be completed, as in 144. The existing unit 300 transmits a message that the update task has begun, as in 146.

Next, the replacement unit 200 requests software header from the existing panel 300 containing the updated application, as in 150. The software header contains information about the software, such as the length of the software and information on how and where to save the software. The replacement unit 200 requests the software header from the existing unit 300 in the network, as in 152. The existing unit 300 processes the request for software header, as in 154. Then, the existing unit 300 provides the software header to the replacement unit 200, as in 156.

The replacement unit 200 begins to request packets from the existing unit 300 in the network providing the software application update, as in 160. The replacement unit 200 requests software packets from the existing unit 300, as in 162. The existing unit 300 processes the software packet request, as in 164. Then, the existing unit 300 returns the software packets that have been requested to the replacement unit 200, as in 166. This exchange continues until all of the software packets have been transferred from the existing unit 300 to the replacement unit 200.

The replacement unit 200 determines when all of the software packets haven been received, as in 170. When all of the packets have been received, the software application transfer is complete. The session is ended, and the replacement unit 200 starts the received software application. The replacement unit 200 sends a message to the existing unit 300 that the software application update is complete, as in 172. The software update task is complete, and the application update task in the existing unit 300 is ended, as in 174. The existing unit 300 sends a message to the replacement unit 200 that the software update task is ended, as in 176. The replacement unit will execute the new software application, as in 180. The normalization or configuration process is complete.

Figure 3:
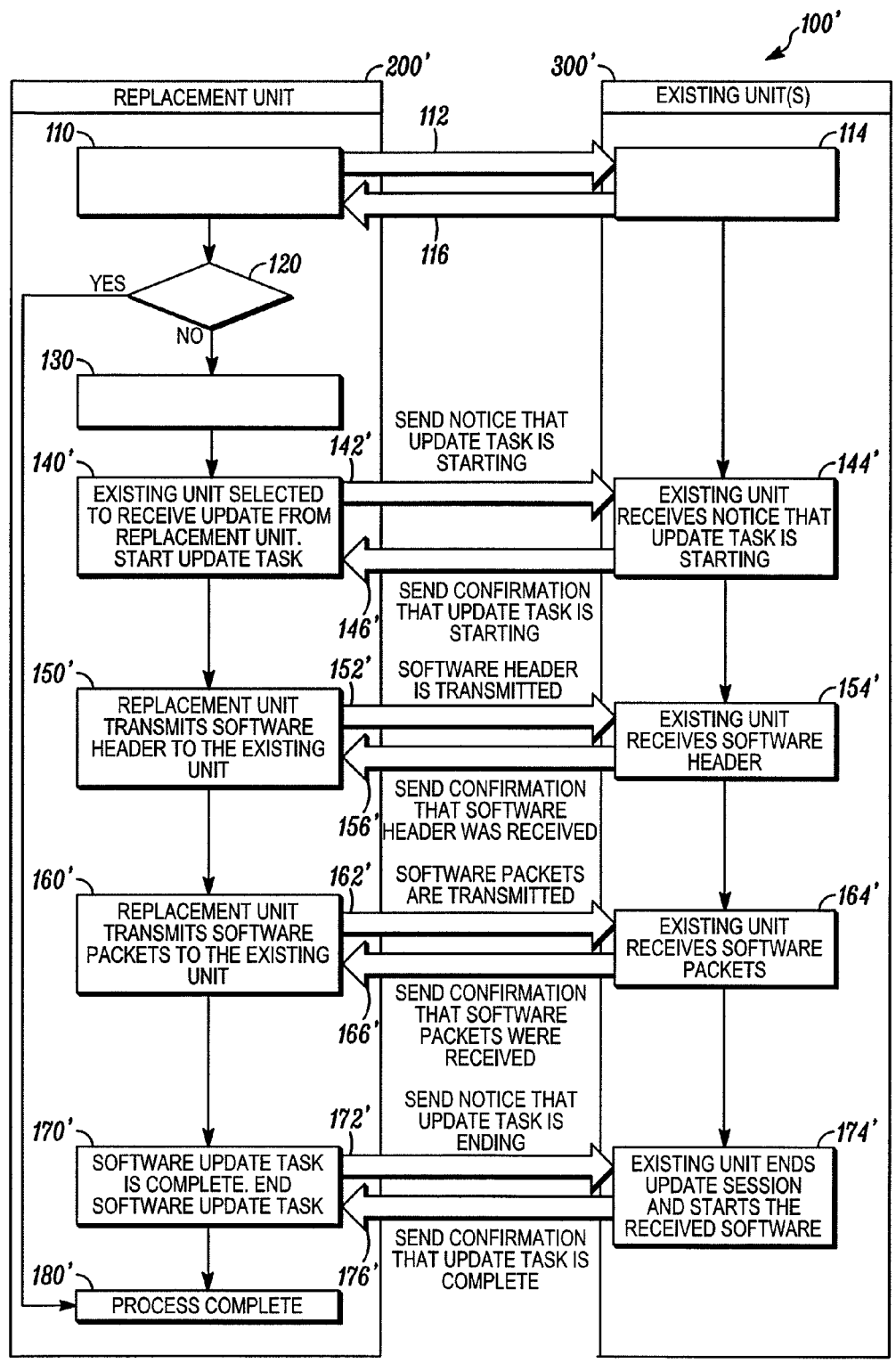
FIG. 3 illustrates a method of operation of a fire detection system in accordance with an alternative embodiment of the present invention.

In an alternative embodiment of the present invention, the replacement unit 200' presents the user with the option to make the replacement unit's 200' software or firmware the same version as the existing units 300' in the network or to make the existing units 300' in the network the same version of software as the replacement unit 200', as in 130. If the user chooses to update an existing unit 300' or units with the application version from the replacement unit 200', then FIG. 3 illustrates the remainder of the method 100' of operation in accordance with this embodiment.

An existing unit 300' or units are selected to receive a software or firmware update from the replacement unit 200', and the update task is started, as in 140'. The replacement unit 200' sends a notice to an existing unit 300' that the update task is starting, as in 142'. The existing unit 300' receives the notice that the update task is starting, as in 144'. Then, the existing unit 300' sends confirmation to the replacement unit 200' that the update task is starting and the existing unit 300' is ready to proceed, as in 146'.

The replacement unit 200' transmits software header to the existing unit 300' that will be updated, as in 150'. The software header contains information about the software, such as the length of the software and information on how and where to save the software. The software header is transmitted, as in 152'. The existing unit 300' receives the software header, as in 154'. Then, the existing unit 300' sends confirmation to the replacement unit 156' that the software header was received, as in 156'.

The replacement unit 200' begins to transmit software packets to the existing unit 300' that will be updated, as in 160'. The software packets are transmitted, as in 162'. The existing unit 300' receives the software packets providing the software update, as in 164'. The existing unit 300' sends confirmation to the replacement unit 200' that the software packets were received, as in 166'. This exchange continues until all of the software packets have been transferred from the replacement unit 200' to the existing unit 300'.

The replacement unit 200' will determine when all of the software packets have been transmitted, as in 170'. When all of the packets have been transmitted, the software update task is complete, and the software update task is ended. The replacement unit 200' sends a notice to the existing unit 300' that the software update task is ending, as in 172'. The existing unit 300' ends the update session and starts the received software, as in 174'. Then, the existing unit 300' transmits a message to the replacement unit 200' that the software update task is complete, as in 176'. The existing unit 300' begins to execute the new software, as in 180'. The normalization or configuration process is complete.

From the foregoing, it will be observed that numerous variations and modifications may be effected without departing from the spirit and scope of the invention. It is to be understood that no limitation with respect to the specific apparatus or method illustrated herein is intended or should be inferred. It is, of course, intended to cover by the appended claims all such modifications as fall within the scope of the claims.

What is claimed is:

1. A fire detection system comprising:
   at least one existing fire detection unit;
   at least one replacement fire detection unit;
   control circuitry associated with the at least one existing fire detection unit;
   control circuitry associated with the at least one replacement fire detection unit;
   a graphical user interface associated with the at least one replacement fire detection unit;
   a graphical user interface associated with the at least one replacement fire detection unit; and
   communication media connecting the at least one existing fire detection unit and the at least one replacement fire detection unit,
   wherein, upon being connected to the communication media, the at least one replacement fire detection unit determines compatibility with the at least one existing fire detection unit,
   wherein the graphical user interface displays a representation of the compatibility, and
   wherein the graphical user interface receives user input instructing an update of the at least one existing fire detection unit or an update of the at least one replacement fire detection unit, and
   wherein, responsive to the user input, the control circuitry associated with the
   replacement unit and the control circuitry associated with the existing unit update the at least one replacement fire detection unit with software from the at least one existing fire detection unit or update the at least one existing fire detection unit with software from the at least one replacement fire detection unit.

2. A fire detection system as in claim 1 wherein the communication media is at least in part one of wired or wireless.

3. A fire detection system as in claim 2 wherein the wired communication media is one of copper wire or fiber cable.

4. A method of configuring a replacement fire detection unit in
   a fire detection system comprising:
   installing the replacement fire detection unit into the fire detection system;
   determining a software application version of at least one existing fire detection unit within the network;
   determining whether a software application version of the replacement fire detection unit is compatible with the software application version of the at least one existing fire detection unit;
   displaying a representation of whether the software application version of the
   replacement fire detection unit is compatible with the software application version of the at least one existing fire detection unit;
   receiving user input instructing an update the replacement fire detection unit or an update
   of the at least one existing fire detection unit; and
   updating the replacement fire detection unit with software from the at least one existing fire detection unit or updating the at least one existing fire detection unit with software from the replacement fire detection unit.

5. The method of claim 4 wherein the replacement fire detection unit includes a graphical user interface for displaying the representation and for receiving the user input.

6. The method of claim 4 wherein the replacement fire detection unit includes control circuitry, the at least one existing fire detection unit includes control circuitry, and the control circuitry of the replacement fire detection unit and the control circuitry of the at least one existing fire detection unit execute the step of updating.

7. The method of claim 4 wherein updating includes presenting a user with an option of updating either the replacement fire detection unit or updating the at least one existing fire detection unit.

8. A replacement fire detection unit that can be incorporated
into an existing network of at least one fire detection unit, the replacement fire detection unit comprising:
control circuitry;
a processor;
a connection port to communication media, the communication media connecting the replacement panel with the existing network of the least one fire detection unit; and
a graphical user interface,
wherein, upon being connected to the communication media, the control circuitry and the processor determine compatibility with the existing network of the at least one fire detection unit,
wherein the graphical user interface displays a representation of the compatibility,
wherein the graphical user interface receives user input instructing an update of a software application of the replacement fire detection unit or an update of software application of the at least one fire detection unit, and
wherein, responsive to the user input, the control circuitry and the processor update the
software application of the replacement fire detection unit with the software application from the at least one fire detection unit or update the software application of the at least one fire detection unit with the software application from the replacement fire detection unit.

9. A replacement fire detection unit as in claim 8 wherein the connection port is configured for wired or wireless communication.

\* \* \* \* \*